Aug. 4, 1959     A. H. ORTMAN     2,897,785

CYLINDER CUSHIONING STRUCTURE

Filed Jan. 2, 1958

INVENTOR:
ALVA H. ORTMAN
BY
Silverman, Mullin & Cass
ATT'YS

United States Patent Office 2,897,785
Patented Aug. 4, 1959

2,897,785

CYLINDER CUSHIONING STRUCTURE

Alva H. Ortman, Crown Point, Ind.

Application January 2, 1958, Serial No. 706,802

6 Claims. (Cl. 121—38)

This invention relates generally to fluid actuated cylinders for use in applying rectilinear power strokes in industrial processes, and more particularly is concerned with a structure for cushioning the piston of the cylinder at one or both ends of its stroke to prevent impact of piston against the heads.

The invention is principally intended for use in connection with cylinders in which the actuating fluid consists of air or gas, and in which tolerances within the cylinder, except between the bushing and the bore where a relatively loose or "sloppy" fit is provided are usually much less than in such cylinders using hydraulic or other more viscous fluids, but is not so limited.

The principal object of the invention is to provide a novel and improved cushioning device in which a packing or O-ring is provided to prevent escape of fluid past a journal or bushing, the said O-ring being positioned on an end face of the said bushing.

Heretofore bushings have been provided with O-rings carried on the peripheral surfaces thereof, but the difficulty attendant upon such construction has been that in installing or removing the said bushing from its seat, the O-ring was liable to become damaged or destroyed. Furthermore, it was difficult to remove the bushing because of the O-ring, and this was true especially where the bushing was held in place by means of a resilient ring, the removal of which left a groove into which the O-ring would expand during attempted removal of the bushing.

An important object of the invention is the provision of a structure eliminating the difficulty above described.

Other objects will appear as the description of the invention proceeds in connection with which I have set forth the details of a proposed embodiment, and illustrated the same in the appended drawing. Minor variations are capable of being made without departing from the spirit of the invention.

Figure 1:
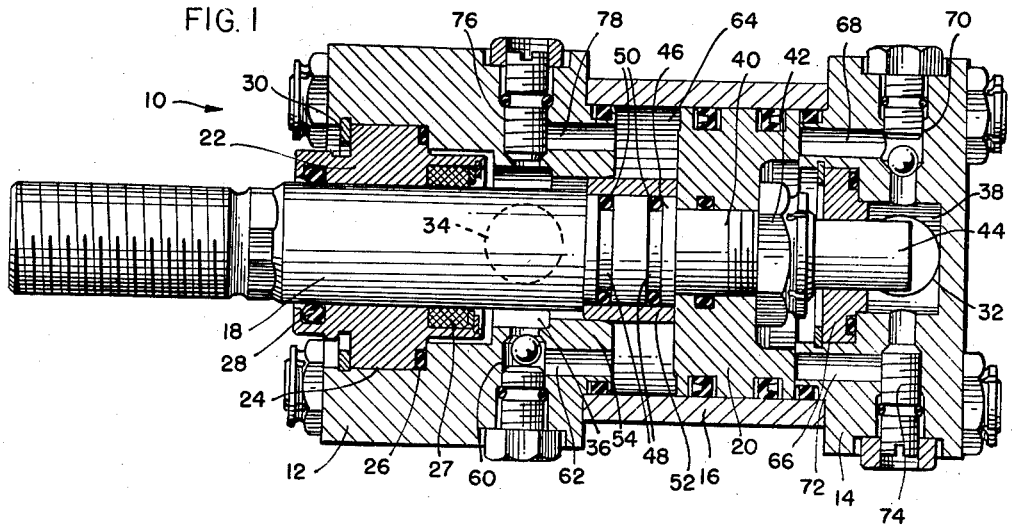
Fig. 1 is a median sectional view through a double acting cylinder having the cushioning structure of my invention associated with the blind end thereof.
Figure 2:
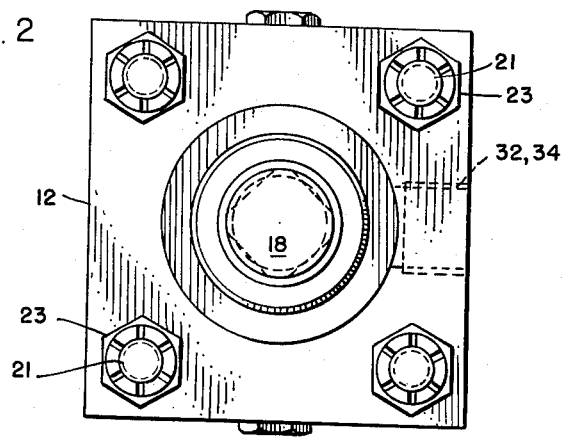
Fig. 2 is an end-on view of the cylinder in elevation.

Referring now to the drawing, the reference character 10 designates generally a cylinder comprising, a rod end cover or head 12, a blind end cover or head 14, a cylindrical tube 16 held in position between suitable shoulders formed on the respective heads, and an elongate piston rod 18 carrying a piston 20 reciprocable between the heads and inside of the cylinder. The heads 12 and 14 are suitably apertured and clamped together by means of conventional tie rods 21 fastened with lock nuts 23. Any other means of securing the cylinder in assembly may be used.

For the most part the construction of the cylinder and its parts is conventional. Thus, there is provided a journal 22 for the rod end of the cylinder which is referred to as a cartridge, suitably seated in a seat 24 provided in the rod end head 12 and gasketed or packed by the cartridge O-ring 26 and the rod packing 27. The cartridge 22 provides a gland at its righthand end with suitable packing as shown at 28 and the entire cartridge assembly is held in place by means of a snap ring of conventional construction illustrated at 30. A fluid is admitted or exhausted by means of port 32 at the blind end and port 34 at the head end, operating in conjunction with conduits and valves so that each part acts as an exhaust means when the piston is moving in one direction and as an inlet means when the piston is moving in the other direction. The ports communicate with suitable chambers formed in the respective ends of the cylinder, the rod end chamber being designated 36 and the blind end chamber being designated 38.

Referring to the piston 20 which is also of substantially conventional construction, the same is secured to a reduced diameter portion 40 of the piston rod 18 by means of a nut 42 which engages over the reduced diameter portion 44 which is of importance in connection with the invention herein. Another reduced diameter portion of the piston rod 18 is shown at 46 and this portion is provided with one or more annular grooves 48 which carry suitable O-rings 50 engaged beneath a bronze cushioning nose 52 which is adapted to enter a cylindrical formation 54 provided in the rod end cover 12. The piston is gasketed for tight sliding movement by means of suitable packing and is also suitably packed upon the reduced diameter portion 40 of the rod 18.

Any valve means desired may be used to control flow of fluid in the cylinder to cushion the piston. In the structure shown, both ends of the cylinder have fixed adjustment needle valves and ball check valves. Thus, for example, by presuming that the fluid is being admitted by way of the port 34 and into chamber 36, it will raise the ball of the ball check valve 60 from its depressed position shown in Fig. 1 so it can pass through the passageway 62 and into the interior chamber 64 of the cylinder. It will engage against the left hand face of the piston 20 forcing the same to the right. As the piston is forced to the right, when the nose 44 enters the bushing 66, it will trap fluid within the right end of the chamber 64. This fluid has three possible means of egress from the interior chamber 64 of the cylinder. It may pass into the chamber 38 and out the port 32 by way of the passageway 68 past the ball check valve 70; if permitted to do so; it may pass through the passageway 72 and past the needle valve 74 if permitted to do so; or it may find its way around the bushing 66. If the ball of the ball check valve 70 is perfectly seated, fluid will not pass through the same thus leaving the other two means as the only escape for the fluid. By adjusting the screw of the needle valve 74, the rate at which the fluid is throttled, that is, permitted to escape into the chamber 38 through this means can be controlled, and this control depends, therefore, upon preventing the escape past the bushing 66. This invention is primarily concerned with a structure relating to the structure of the bushing 66 to prevent such escape.

The opposite stroke of the piston will cooperate with the needle valve 76, its passageway 78 and the ball check 60 and its passageway 62 in also providing the desired cushioning. The remainder of the structure which comprises the O-rings 50, bushing 52 and the cylindrical portion 54 aid in preventing escape of fluid from the interior chamber 64 other than by way of the passageway 78 when the port 34 serves as an exhaust.

Considering now the construction of the bushing 66, it will be noted that this bushing is of generally disc-like formation having a reduced diameter portion 80 which engages within the entrance to the chamber 38. The right hand face 82 of the bushing is therefore slightly spaced axially from the right hand end face 84 of portion 80 of the bushing, and this face 82 engages against the bottom 85 of the cylindrical bore 86 formed in the blind end cover 14. Obviously the portion 80 may be omitted. The bushing is held in place with substantially close axial tolerance by means of a resilient snap ring 88 seated in an annular groove 90 which is formed at the entrance of the bore 86. To install or remove the bushing 66 it is, therefore, necessary to remove the snap ring 88 and slide the said bushing 66 in or out of the bore 86. It will be noted that, should the peripheral edge 92 of the bushing have any protuberances such as, for example, an O-ring as in other known structures, since the O-ring, which is under compression, passes the groove 90 either in attempting to install or remove the said bushing 66, it will expand into the said groove 90 and make such removal or installation difficult. Furthermore, in attempting to force the bushing past the said groove 90, the O-ring will be torn or destroyed, thereby decreasing its effectiveness in preventing fluid from escaping past the bushing 66.

Figure 3:
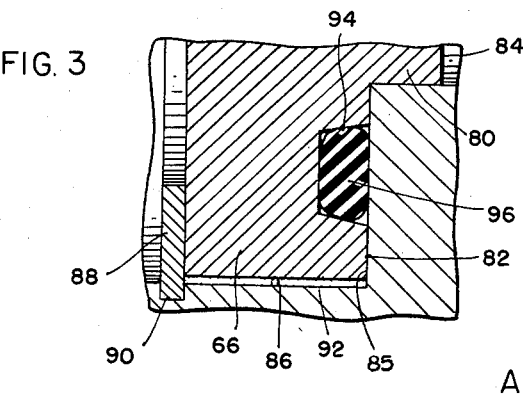
Fig. 3 is a fragmentary sectional view showing the bushing installation.

According to the invention the right hand face 82 of the bushing is provided with an annular groove 94 which is of generally trapezoidal cross-section having its side walls tapered inwardly. This is best shown in Fig. 3. A conventional O-ring 96 is positioned within the groove 94 so that when the bushing 66 is inserted into the bore 86 and pushed home to seat the face 82 in the bottom 85 of the bore 86, the O-ring 96 will be compressed and held under compression after the ring 88 is engaged in its groove 90. The O-ring 96 is necessary in order to provide for sealing the relatively loose or "sloppy" fit of the bushing 66 in the bore 86.

It will be appreciated that the bushing 66 of the invention is easily installed and easily removed without in any way damaging the O-ring 96. As a matter of fact, as soon as released by the removal of the resilient ring 88, the bushing will unseat itself due to the release of pressure against the O-ring 96 and is very easily withdrawn.

The construction which provides the O-ring, as shown on the end face 82 of the bushing 66, is advantageous in an important respect in that, when the greatest sealing of fluid is desired, as during the stroke of the piston to the right, an axial thrust will be applied to the bushing 66 by the compressed fluid, thereby applying the greatest compression to the O-ring 96 and increasing its effectiveness to a greater extent than if the O-ring were engaged on the peripheral edge 92 of the bushing 66. Furthermore, there is no need to provide special tools to compress the O-ring for insertion of the bushing into the bore 86, but the O-ring 96 may be permitted to protrude a substantial distance from its groove 94 to provide a better fluid seal at the blind end of the cylinder.

The groove 94 may be provided in the bottom wall 85 of the bore 86 and the end face 82 permitted to remain planar, with substantially the same effectiveness. It is not deemed necessary to illustrate this structure.

It is believed that the invention has been fully explained such as to enable those skilled in the art to understand and practice the same, and it is desired to point out that cushioning means of this type may also be used on rod ends of cylinders and with many variations in structure and design.

I claim:

1. In a cylinder construction in which there are provided a reciprocating piston and piston rod, a tubular chamber within which said piston moves, cylinder heads at the ends of the chamber, means in said heads for admitting and exhausting fluid from said chamber to drive said piston and rod, and structure in at least one head for cushioning the piston and rod at the end of its stroke in said chamber toward said one head comprising, means for trapping a portion of the fluid being exhausted from said chamber and means for throttling the flow thereof from said chamber, said trapping means including a cylindrical bore formed in said one head coaxial with said piston and rod and having a generally radially extending bottom wall, a removable bushing seated in said bore with an end face thereof juxtaposed relative to said bottom wall, the piston and rod having an extension telescopically entering into said bushing at the end of the said stroke to prevent fluid from exhausting by way of said bushing, packing means between said end face and bottom wall radially displaced from both the rod and peripheral edges of the bushing to prevent escape of fluid between bushing and bore.

2. A structure as claimed in claim 1 in which said packing means comprises an O-ring of an overall diameter less than that of the bushing and said bushing has an annular groove in its end face opening toward said bottom wall seating said O-ring.

3. A structure as claimed in claim 1 in which said packing means comprises an O-ring of an overall diameter less than that of the bushing and said bushing has an annular groove in the end face thereof opening toward said bottom wall of substantially trapezoidal cross-section seating said O-ring.

4. A structure as claimed in claim 1 in which said packing means comprises a resilient O-ring, and said bushing has an annular groove in its end face opening toward said bottom wall seating said O-ring but with a depth less than the thickness of said ring and the bore has means at the entrance thereof substantially locking the bushing within the bore, the distance between the locking means and the bottom wall being such as to cause compression of said O-ring when said bushing is locked in place.

5. A structure as claimed in claim 1 in which said bore is provided with a readily removable resilient snap ring at the entrance thereof engaged against said bushing to hold the same in place with compression applied axially to said packing means enabling facile disassembly of said bushing from said bore.

6. In a construction of the character described, which includes a cylinder head having a cylindrical bore provided with a cylindrical bushing and having an annular groove in the bore with a snap ring engaged therein and the bushing seated in the bore and locked in the bottom thereof with the end face of the bushing engaged with the bottom wall of the bore by means of said snap ring, a cushion nose adapted to reciprocably move into said bushing and force fluid to flow past the same; means to limit said flow which comprises an O-ring of lesser outside diameter than the bushing compressed between the said end face of said bushing and said bottom wall of said bore, with the axis of the said O-ring substantially perpendicular to the surface of said bottom wall and end face of the bushing.

References Cited in the file of this patent

UNITED STATES PATENTS

| | | |
|---|---|---|
| 2,493,602 | Sterrett | Jan. 3, 1950 |
| 2,631,577 | Carter | Mar. 17, 1953 |
| 2,702,023 | Seeloff | Feb. 15, 1955 |
| 2,751,886 | Doutt | June 26, 1956 |
| 2,804,052 | Halladay | Aug. 27, 1957 |
| 2,822,196 | Canfield | Feb. 4, 1958 |

FOREIGN PATENTS

| | | |
|---|---|---|
| 623,478 | Great Britain | May 18, 1949 |
| 746,694 | Great Britain | Mar. 21, 1956 |